US012770213B2

(12) United States Patent
Shen et al.

(10) Patent No.: US 12,770,213 B2
(45) Date of Patent: Oct. 20, 2026

(54) EFFICIENT HYBRID-GRAPHICS PIPELINE

(71) Applicants: Advanced Micro Devices, Inc., Santa Clara, CA (US); ATI Technologies ULC, Markham (CA)

(72) Inventors: Yuping Shen, Oviedo, FL (US); Adeel Nasim Syed, Waterdown (CA); Anthony Wai Lap Koo, Aurora (CA); Bohan Shi, Richmond Hill (CA); Felipe Sander Pereira Clark, Woodbridge (CA); ZhuoQiao Liang, Shanghai (CN); HongYu Lu, Shanghai (CN); Michael Gharbharan, Mississauga (CA); Nitant Patel, Brampton (CA); YongYong Wu, Shanghai (CN)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 33 days.

(21) Appl. No.: 18/763,755

(22) Filed: Jul. 3, 2024

(65) Prior Publication Data

US 2026/0010967 A1 Jan. 8, 2026

(51) Int. Cl.

| | |
|---|---|
| ***G06T 1/00*** | (2006.01) |
| ***G06F 21/62*** | (2013.01) |
| ***G06T 1/20*** | (2006.01) |

(52) U.S. Cl.

CPC ............ *G06T 1/20* (2013.01); *G06F 21/6209* (2013.01)

(58) Field of Classification Search

None

See application file for complete search history.

(56) References Cited

U.S. PATENT DOCUMENTS

| | | | | |
|---|---|---|---|---|
| 6,621,864 | B1 * | 9/2003 | Choo | H04N 19/132 375/E7.25 |
| 7,385,609 | B1 * | 6/2008 | Lindholm | G06T 1/20 345/506 |
| 8,347,291 | B2 * | 1/2013 | Marwinski | G06F 9/4881 718/100 |
| 8,566,647 | B2 | 10/2013 | Maybee et al. | |
| 9,535,815 | B2 | 1/2017 | Smith et al. | |
| 10,679,317 | B2 | 6/2020 | Kinross et al. | |
| 12,010,360 | B1 * | 6/2024 | Larkin | H04N 21/44 |

(Continued)

*Primary Examiner* — Martin Mushambo

(74) *Attorney, Agent, or Firm* — Kowert, Hood, Munyon, Rankin & Goetzel, P.C.; Rory D. Rankin

(57) ABSTRACT

An apparatus and method for efficiently managing jobs of a workload performed among multiple integrated circuits in separate semiconductor chips. In various implementations, a computing system includes a first processing node and a second processing node that together render and present video frame data. The graphics application holds the start of processing the next video frame until the first processing node receives result data for the current video frame from the second processing node and presents the video frame data. To remove latency, once the result data is generated, the first processing node performs a mocked present job visible to the operating system scheduler but sends no data to the display controller. The rendering of the next video frame begins, and the first processing node later presents the result data to the display controller.

20 Claims, 8 Drawing Sheets

(56) References Cited

U.S. PATENT DOCUMENTS

| | | | | |
|---|---|---|---|---|
| 2003/0120701 | A1* | 6/2003 | Pulsipher | G06F 9/4843 718/102 |
| 2003/0120708 | A1* | 6/2003 | Pulsipher | G06F 9/4881 718/106 |
| 2003/0120710 | A1* | 6/2003 | Pulsipher | G06F 11/0715 718/106 |
| 2004/0025163 | A1* | 2/2004 | Babutzka | G06F 9/5038 718/106 |
| 2010/0110083 | A1* | 5/2010 | Paltashev | G06F 15/7867 345/506 |
| 2010/0110089 | A1* | 5/2010 | Paltashev | G06T 1/20 345/522 |
| 2010/0287396 | A1* | 11/2010 | Barth | G06F 11/3423 702/182 |
| 2012/0159261 | A1* | 6/2012 | Maybee | G06F 11/323 714/E11.212 |
| 2014/0053161 | A1* | 2/2014 | Sadowski | G06F 9/4887 718/102 |
| 2015/0355996 | A1* | 12/2015 | Smith | G06F 9/461 717/128 |
| 2016/0054782 | A1* | 2/2016 | Kaburlasos | G06F 1/3234 713/320 |
| 2016/0132987 | A1* | 5/2016 | Li | G09G 5/18 345/522 |
| 2018/0310013 | A1* | 10/2018 | Tanner | H04N 19/53 |
| 2019/0066353 | A1* | 2/2019 | Anderson | G06T 15/005 |
| 2019/0317802 | A1* | 10/2019 | Bachmutsky | G06F 9/5044 |
| 2020/0027190 | A1* | 1/2020 | Kinross | G06T 1/20 |
| 2020/0272507 | A1* | 8/2020 | Gauthier | G06F 9/5027 |
| 2021/0152861 | A1* | 5/2021 | Murakami | H04H 20/18 |
| 2021/0373892 | A1* | 12/2021 | Tovey | G06F 9/30076 |
| 2022/0400227 | A1* | 12/2022 | Jun | H04N 7/147 |
| 2023/0206537 | A1* | 6/2023 | Perry | A63F 13/77 |
| 2024/0095021 | A1* | 3/2024 | Agrawal | G06F 8/656 |
| 2024/0211014 | A1* | 6/2024 | Kao | G09G 5/363 |

* cited by examiner

EFFICIENT HYBRID-GRAPHICS PIPELINE

BACKGROUND

Description of the Relevant Art

A variety of computing devices utilize heterogeneous integration, which integrates multiple types of semiconductor dies for providing system functionality. A variety of choices exist for system packaging to integrate the multiple types of semiconductor dies. In some computing devices, a system-on-a-chip (SOC) is used, whereas, in other computing devices, smaller and higher-yielding chips are packaged as large chips in multi-chip modules (MCMs). Yet other system packages include an accelerated processing unit (APU) as a single semiconductor chip, and so forth. Different semiconductor chips, each with their own semiconductor chip package that includes one or more semiconductor dies, are placed on a motherboard of a computing device. Examples of computing devices are a desktop computer, a server computer, a laptop computer, and so on.

The semiconductor chips communicate with one another with transmission of electrical signals through metal traces on the motherboard. Some of these semiconductor chips on the motherboard include memory devices. While processing tasks or jobs of a workload, circuitry of the first semiconductor chip is dependent on results generated by circuitry in a second semiconductor chip processing source data. An application that provides the workload holds the start of processing of a next iteration of a loop until the first semiconductor chip receives and processes the results from the second semiconductor chip. An example of the application is a parallel data graphics application that processes multiple frames of video data. The first semiconductor chip cannot send rendered video frames to a display controller until the first semiconductor chip receives the rendered video frames from the second semiconductor chip. The latency of the data transport reduces performance and reduces utilization of at least the two semiconductor chips.

In view of the above, efficient methods and apparatuses for efficiently managing jobs of a workload performed among multiple processing circuits in separate semiconductor chips are desired.

Figure 1:
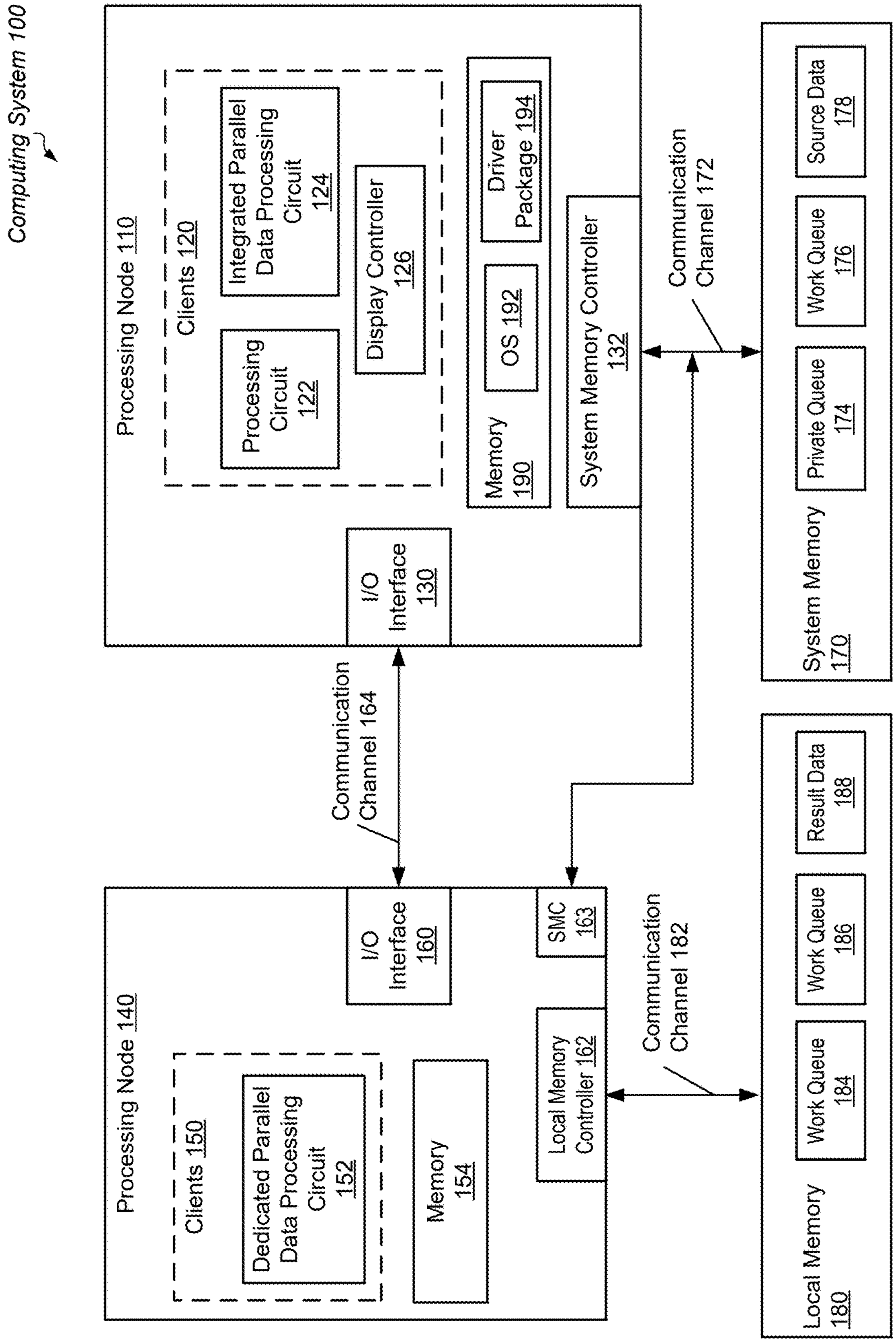
FIG. 1 is a generalized diagram of a computing system that efficiently manages jobs of a workload performed among multiple processing circuits in separate semiconductor chips.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods for efficiently managing jobs of a workload performed among multiple processing circuits in separate semiconductor chips are contemplated. In various implementations, a computing system includes a first processing node and a second processing node. The hardware, such as circuitry, of each of the first processing node and the second processing node provides a variety of functionalities. As used herein, a "processing node" includes multiple processing circuits, such as integrated circuits, utilizing access to a corresponding local memory subsystem to perform the variety of functionalities. In various implementations, each processing node is a separate semiconductor chip in a multi-chip module (MCM) or a separate semiconductor chip on a motherboard. A processing node can also be a semiconductor chip on a card that is plugged into a slot on the motherboard.

The first processing node includes a first processing circuit and a second processing circuit. In some implementations, the first processing circuit is a host general-purpose processing circuit, such as a central processing unit (CPU). The first processing circuit can be referred to as the "host processing circuit." The second processing circuit is a parallel data processing circuit with a relatively wide single-instruction-multiple-data (SIMD) microarchitecture such as a graphics processing unit (GPU). In implementations where the second processing circuit is a GPU, since each of the first processing circuit and the second processing circuit is included in the first processing node, the second processing circuit is an on-chip, integrated GPU also referred to as an "iGPU." The second processing circuit can be referred to as the "integrated processing circuit." In various implementations, the second processing node includes a third processing circuit that is also a GPU but includes more hardware resources than the second processing circuit (iGPU). The third processing circuit is considered off-chip, since the third processing circuit is not on the same semiconductor chip as the second processing circuit (iGPU). Such an off-chip, dedicated (or discrete) GPU is also referred to as a "dGPU." The third processing circuit can be referred to as the "dedicated processing circuit." In some implementations, the second processing node is a dedicated video graphics chip or chipset with the dedicated GPU (dGPU).

The integrated processing circuit in the first processing node is dependent on result data generated by the dedicated processing circuit in the second processing node. Typically, the parallel data graphics application (or application) that provides the workload holds the start of processing of a next iteration of a loop until the processing circuit in the first processing node receives and processes the result data from the dedicated processing circuit in the second processing node. However, the proposed solution includes the integrated processing circuit generating synchronization signals from a private queue that allows the next iteration of the loop to begin earlier and remove the data transport latency from the start of processing of the next iteration of the loop. The integrated processing circuit begins generating the synchronization signals based on the dedicated processing circuit has generated the result data but has not yet transported the result data to the first processing node. The latency of the data transport is removed from delaying the start of the next iteration of the loop. This removal of the data transport latency increases performance and increases utilization of the two processing nodes. The integrated processing circuit (on-chip iGPU) removes the data transport latency unbeknownst to the host processing circuit (CPU) executing the operating system. There is no change to the application. The graphics driver executed by the integrated processing circuit performs the steps to remove the latency of the data transport job before starting the next iteration of the loop.

Typically, the start of the next iteration of the loop of the workload waits for at least the above data transport to be completed, which reduces performance and reduces utilization of the two processing nodes. In various implementations, the host processing circuit (CPU, other) executes the operating system that divides the workload of the application into multiple tasks or jobs and assigns the multiple jobs to multiple different work queues associated with processing circuits among the two processing nodes. The host processing circuit executing the operating system determines when to begin the next iteration of the loop.

In an implementation, the loop of the parallel data graphics application includes a first step of the host processing circuit determining to begin the next iteration of the loop, a second step of the dedicated processing circuit (off-chip dGPU) of the second processing node performing one or more rendering jobs to render video frame data, a third step of the second processing node performing a data transfer job to transport the rendered video frame data to the integrated processing circuit (on-chip iGPU) of the first processing node, and a fourth step of the integrated processing circuit performing a present job to send the rendered video frame data to the display controller. In such an implementation, the integrated processing circuit is connected to the display controller. In various implementations, the application uses a frame latency control mechanism that holds the first step of the start of the next iteration of the loop for a next video frame until the fourth step completes the present job that sends the rendered data of the current video frame to the display controller.

To remove the latency associated with the data transport of the rendered video frame data between the two processing nodes, the dedicated processing circuit (off-chip dGPU) of the second processing node generates an indication specifying completion of the rendering job responsive to the dedicated processing circuit has generated the result data but has not yet transported the result data to the first processing node. In some implementations, the indication is a complete or signal semaphore. In other implementations, the indication is a hardwired signal that is asserted upon completion of the rendering job. The generated indication unblocks a first wait synchronization point in a work queue such as a data transfer work queue. The second processing node performs, based on the first wait synchronization point, a data transfer job in a work queue to transport the rendered video frame to the first processing node. The indication generated upon completion of the rendering job unblocks a second wait synchronization point in a private queue. The first processing node performs, based on the second wait synchronization point, a mock present job in a work queue that sends no information to a display controller unbeknownst to the operating system.

When the mock present job has been completed, the first processing node generates an indication specifying completion of the mock present job. The indication generated upon completion of the mock present job unblocks a frame latency control wait synchronization point for the first processing node and the next iteration of the loop begins for the next video frame. When executing the instructions of the application, the first processing node selects the next video frame to render and present based on completion of the mock present job. The operating system scheduler is unaware that the mock present job did not send any information to the display controller.

When the data transfer job has been completed, the first processing node unblocks a third wait synchronization point in a private queue. In an implementation, the first processing node generates an indication specifying completion of the data transfer job, and this indication unblocks the third wait synchronization point in the private queue. The first processing node performs, based on the third wait synchronization point, a present job in a private queue that sends information to the display controller. Further details of these techniques to efficiently manage jobs of a workload performed among multiple integrated circuits in separate semiconductor chips are provided in the following description of FIGS. 1-8.

Referring to FIG. 1, a generalized diagram is shown of a computing system 100 that manages performance among multiple integrated circuits in separate semiconductor chips. In the illustrated implementation, computing system 100 includes the processing nodes 110 and 140, system memory 170, local memory 180, and communication channels 162, 172, and 182. The hardware, such as circuitry, of each of the first processing node 110 and the second processing node 140 provides a variety of functionalities. For example, processing node 110 includes numerous semiconductor dies such as clients 120 and the processing node 140 includes clients 150. As used herein, a "client" refers to an integrated circuit with data processing circuitry and internal memory, which has tasks or jobs assigned to it by an operating system (OS) scheduler. Examples of tasks or jobs are software threads of a process of an application, which are scheduled by the OS scheduler. In various implementations, each of processing node 110 and processing node 140 is a separate semiconductor chip.

Examples of clients are a host general-purpose processing circuit, such as a central processing unit (CPU), a parallel data processing unit with a relatively wide single-instruction-multiple-data (SIMD) microarchitecture such as a graphics processing unit (GPU), a multimedia integrated circuit, one of a variety of types of an application specific integrated circuit (ASIC), a digital signal processor (DSP), a field programmable gate array (FPGA), one or more microcontrollers, and so forth. For example, clients 120 of processing node 110 include at least processing circuit 122, an integrated parallel data processing 124 circuit, and display controller 126.

In various implementations, processing circuit 122 is a host general-purpose CPU and integrated parallel data processing circuit 124 is an on-chip, integrated parallel data processing circuit such as a GPU. This on-chip, integrated GPU is also referred to as an "iGPU." Processing circuit 122 can be referred to as "host processing circuit 122." Processing circuit 124 can be referred to as "integrated processing circuit 124." Each of clients 120 includes one or more caches of a multi-level cache memory subsystem and/or a dedicated local memory. Memory 190 also includes one or more caches of the cache memory subsystem and/or dedicated local memory. Memory 190 stores driver package 194, which is a copy of a driver package stored in system memory 170. Memory 190 also stores operating system 192, which is a copy of at least a portion of an operating system stored in system memory 170.

In some implementations, the driver package 194 is a video graphics driver downloaded from a network such as the Internet. In some implementations, driver package 194 includes separate components such as one or more of driver files, an installation file, a catalog file, and device files. The driver files of the driver package 194 include dynamic link libraries (DLL) files of a user mode driver (UMD) and a kernel mode driver (KMD).

The installation file (.inf file) includes information such as the name of the driver package 194, a version of the graphics driver package, and registry information. When executing an application (not shown) stored in system memory 170, processing circuit 122 uses installations of the UMD and KMD of the driver package 194.

Clients 150 of processing node 140 include at least dedicated parallel data processing circuit 152 and one or more caches of a cache memory subsystem (not shown). Memory 154 also includes one or more caches of the cache memory subsystem and/or dedicated local memory. Memory 154 stores a copy of information stored in local memory 180 and system memory 170. Memory 154 also stores a copy of result data generated by clients 150 prior to storing information in one or more of local memory 180 and system memory 170. In various implementations, parallel data processing unit 152 is an off-chip, dedicated parallel data processing circuit such as a GPU. Such an off-chip, dedicated GPU is also referred to as a "dGPU." Processing circuit 152 can be referred to as "dedicated processing circuit 152." Dedicated processing circuit 152 is considered off-chip since dedicated processing circuit 152 is not on the same semiconductor chip as host processing circuit 122. Integrated parallel data processing circuit 124 (or integrated processing circuit 124) is considered on-chip since integrated processing circuit 124 is on the same semiconductor chip as host processing circuit 122.

In some implementations, processing node 140 is a dedicated video graphics chip or chipset with a dedicated parallel data processing unit such as a dedicated GPU (dGPU). In various implementations, dedicated processing circuit 152 provides higher performance than integrated processing circuit 124. For example, compared to integrated processing circuit 124, dedicated processing circuit 152 has more compute circuits, has more SIMD circuits per compute circuit, has more lanes of execution per SIMD circuit, is capable of using a higher clock frequency, is capable of using a higher power supply voltage, and so on.

Clock sources, such as phase lock loops (PLLs), an interrupt controller, a communication fabric, power controllers, memory controllers, interfaces for input/output (I/O) devices, and so forth are not shown in the computing system 100 for ease of illustration. It is also noted that the number of components of the computing system 100 and the number of subcomponents for those shown in FIG. 1, such as within clients 120 and clients 150, can vary from implementation to implementation. There can be more or fewer of each component/subcomponent than the number shown for the computing system 100.

In an implementation, processing node 110 is a system on a chip (SoC) in a semiconductor package on a motherboard. System memory 170 is provided in a separate semiconductor package on the motherboard. System memory 170 includes any number and type of memory devices. For example, the type of memory in the memory devices of system memory 170 includes one or more of Dynamic Random Access Memory (DRAM), Static Random Access Memory (SRAM), one of a variety of types of synchronous random-access memory (RAM), NAND Flash memory, NOR flash memory, Ferroelectric Random Access Memory (FeRAM), or otherwise.

Processing node 110 accesses system memory 170 while processing tasks of a workload. Processing node 110 uses system memory controller 132 to transfer data with the system memory 170 via the communication channel 172. In various implementations, the communication channel 172 is a point-to-point (P2P) communication channel. A point-to-point communication channel is a dedicated communication channel between a single source and a single destination. Therefore, the point-to-point communication channel transfers data only between the single source and the single destination. The address information, command information, response data, payload data, header information, and other types of information are transferred on metal traces or wires that are accessible by only the single source and the single destination. In an implementation, the system memory controller 132, the communication channel 172, and the system memory 170 support one of a variety of types of a Double Data Rate (DDR) communication protocol or one of a variety of types of a Low-Power Double Data Rate (LPDDR) communication protocol.

Processing node 140 accesses local memory 180 while processing tasks or jobs of a workload. Similar to system memory 170, in an implementation, local memory 180 is off-chip memory. In an implementation, processing node 140 is a system on a chip (SoC) in a semiconductor package on the motherboard and local memory 180 is one of a variety of types of RAM in a separate semiconductor package on the motherboard. In another implementation, processing node 140 is a graphics card plugged into a slot on the motherboard. Processing node 140 uses local memory controller 162 to transfer data with local memory 180 via the communication channel 182. In an implementation, the local memory controller 162 supports one of a variety of types of a Graphics Double Data Rate (GDDR) communication protocol. Processing node 140 uses system memory controller (SMC) 163 to transfer data with system memory 170.

Communication channel 164 transfers data between integrated circuits of processing node 110 and processing node 140. Processing node 110 includes the input/output (I/O) interface 130 to support data transmission on the communication channel 164. Similarly, processing node 140 includes the I/O interface 160 to support data transmission on the communication channel 164. In various implementations, communication channel 164 is a point-to-point (P2P) communication channel. Relative to processing node 110, processing node 140 is an external processing node. Processing node 110 is able to communicate and transfer data with another processing node, such as processing node 140, which is external to the processing node 110. Similar to other interfaces, such as the system memory controller 132 and the local memory controller 162, the I/O interfaces 130 and 160 include one or more queues for storing requests, responses, and messages, and include circuitry that builds packets for transmission and that disassembles packets upon reception. One or more of these components 130, 132, 160 and 182 also include power management circuitry, and circuitry that supports a particular communication protocol. In an implementation, the I/O interfaces 130 and 160 support a communication protocol such as the Peripheral Component Interconnect Express (PCIe) protocol.

When processing node 110 and processing node 140 execute a workload together, processing nodes 110 and 140 initially set up a coordinated access schedule of system memory 170 and local memory 180. This coordinated access schedule determines which pipeline stage or clock cycle each of processing node 110 and processing node 140 is permitted to access a particular address range. In various implementations, the processing nodes 110 and 140 execute a parallel data application such as a video graphics application. The application includes multiple iterations of a loop with each iteration of the loop processing a single video frame.

Each iteration of the loop includes a first step of host processing circuit 122 determining to begin the next iteration of the loop and select a video frame from source data 178, a second step of dedicated processing circuit 152 of processing node 140 performing one or more rendering jobs to render video frame data of source data 178, a third step of processing node 140 performing a data transfer job to transport the rendered video frame data of result data 188 to integrated processing circuit 124 of processing node 110, and a fourth step of integrated processing circuit 124 performing a present job to send the rendered video frame data of result data 188 to the display controller 126. In various implementations, the application uses a frame latency control mechanism that holds the first step of the start of the next iteration of the loop for a next video frame until the fourth step completes the present job that sends the rendered data of the current video frame to the display controller 126. When executing the operating system scheduler, hots processing circuit 122 assigns work queues 176, 184 and 186 to processing nodes 110 and 140. These work queues store jobs for clients 120 and 150 to process.

To remove the latency associated with the data transport of the rendered video frame data between processing nodes 110 and 140, integrated processing circuit 124 of clients 120 executes instructions of a driver (e.g., driver package 194) that assigns private queue 174 to processing node 110. In some implementations, private queue 174 includes one or more "wait to start" (or wait) synchronization points and a present rendered data job. In an implementation, the present rendered data job stored in the private queue 174 is a copy of a present job in one of the work queues of processing node 110 such as work queue 176. In other implementations, the instructions of the present rendered data jobs in work queue 176 and private queue 174 send information to the display controller, but contain one or more different instructions from one another. In some implementations, once dedicated processing circuit 152 has generated rendered data of a first video frame, one of the wait synchronization points in private queue 174 becomes unblocked. Therefore, integrated circuit 124 performs a mocked present job visible to the operating system scheduler executed by host processing circuit 122, but integrated circuit 124 sends no data to display controller 126. In response, host processing circuit 122 begins the next iteration of the loop and selects a second video frame from source data 178. Dedicated processing circuit 152 begins rendering of the second video frame. By performing the mocked present job, which causes dedicated processing circuit 152 to render the second video frame earlier, integrated processing circuit 124 removes the data transport latency unbeknownst to host processing circuit 122 executing the operating system scheduler. There is no change to the application. This removal of the data transport latency increases performance and increases utilization of processing nodes 110 and 140. Integrated processing circuit 124 later presents the rendered data of the first video frame to display controller 126.

As described earlier, the number of components of computing system 100 and the number of subcomponents for those shown in FIG. 1, such as within clients 120 and clients 150, can vary from implementation to implementation. In addition, the arrangement of components of computing system 100 can vary in other implementations. For example, in an implementation, display controller 126 is located in clients 150 of processing node 140, rather than located in clients 120. In such an implementation, integrated processing circuit 124 performs rendering jobs for video frames and dedicated processing circuit 152 performs present jobs for rendered video frames. In other implementations, clients 150 includes multiple dedicated processing circuits used for rendering video frames. In either of these implementations where data transfer is used to send rendered video frame data between processing nodes 110 and 140, and computing system 100 utilizes integrated processing circuit 124 and dedicated processing circuit 152 in addition to host processing circuit 122, computing system 100 utilizes "hybrid graphics" techniques to increase performance of data processing of video frames. Further details of the steps performed by processing nodes 110 and 140 are provided in the description of FIGS. 2-8.

Figure 2:
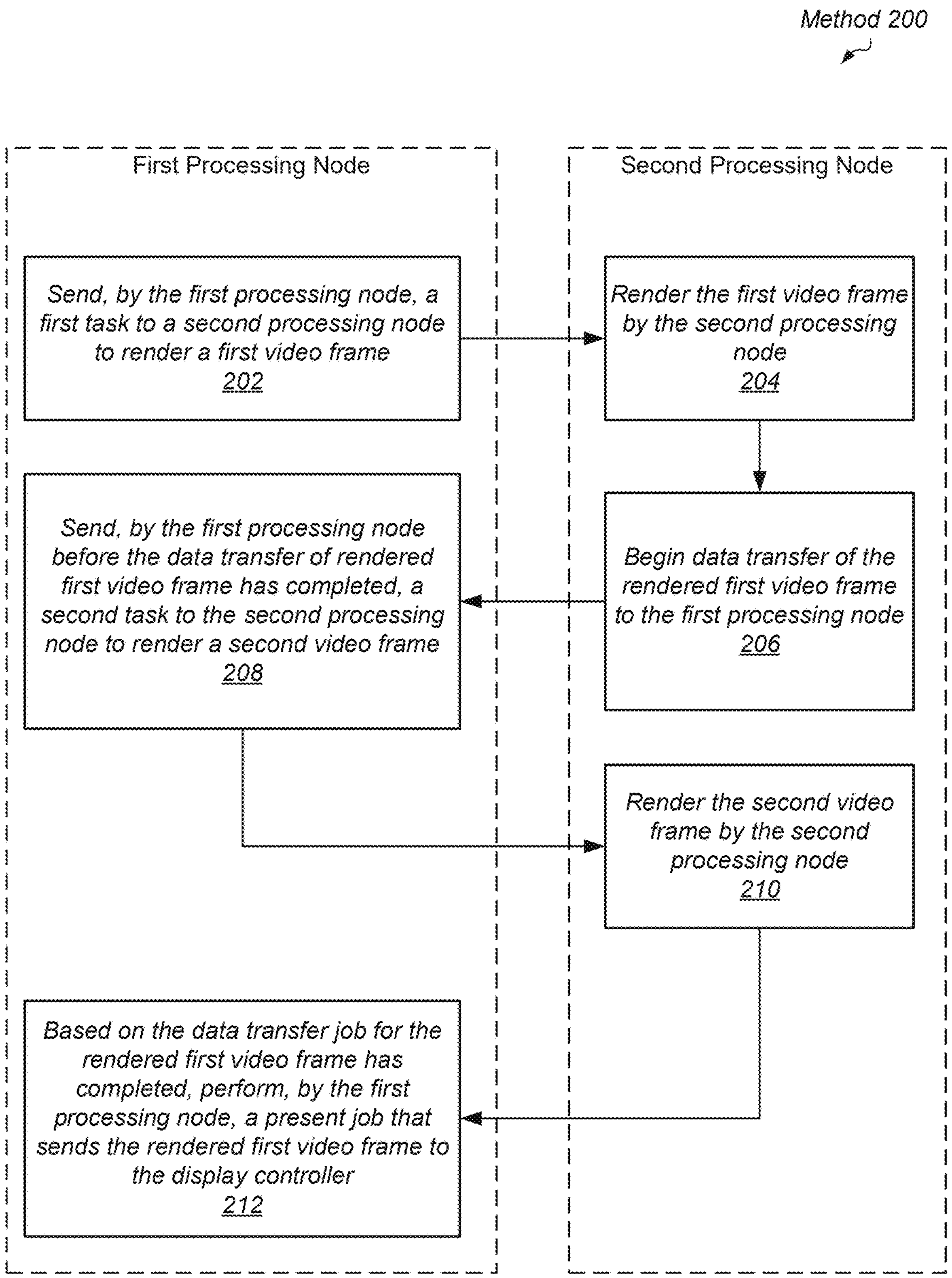
FIG. 2 is a generalized diagram of a method for efficiently managing jobs of a workload performed among multiple processing circuits in separate semiconductor chips.

Referring to FIG. 2, a generalized diagram is shown of a method 200 for efficiently managing jobs of a workload performed among multiple integrated circuits in separate semiconductor chips. For purposes of discussion, the steps in this implementation (as well as in FIGS. 7-8) are shown in sequential order. However, in other implementations some steps occur in a different order than shown, some steps are performed concurrently, some steps are combined with other steps, and some steps are absent.

A computing system includes a first processing node and a second processing node. The hardware, such as circuitry, of each of the first processing node and the second processing node provides a variety of functionalities. In various implementations, each of the first processing node and the second processing node is a separate semiconductor chip. An application provides a workload for the first processing node and the second processing node. In various implementations, the application is a parallel data graphics application that processes multiple frames of video data. The application includes multiple iterations of a loop with each loop processing a single video frame. The data processing includes rendering the video frames on the second processing node, transporting the rendered video data to the first processing node, and presenting the rendered video data, by the first processing node, to a display controller. When executing the operating system scheduler, the circuitry of the first processing node sends a first task to the second processing node to render the first video frame (block 202). In various implementations, the first processing node generates a first pointer specifying a storage location storing data of the first video frame to render and present. The first processing node sends the first pointer with the first task to the second processing node. Circuitry of the second processing node renders the first video frame (block 204). In various implementations, the second processing node is a dedicated video graphics chip or chipset with a dedicated GPU (dGPU). The second processing node uses the first pointer to locate the storage location of the first video frame to render.

The second processing node begins data transfer of the rendered first video frame to the first processing node (block 206). A direct memory access (DMA) circuit, an input/output (I/O) interface, or other circuitry performs the data transfer of the rendered first video frame from the second processing node to the first processing node. The first processing node sends, before the data transfer of the rendered first video frame has completed, a second task to the second processing node to render a second video frame (block 208). In some implementations, the first processing node sends the second task based on detecting the render operation for the first video frame has completed. In other implementations, the first processing node sends the second task based on detecting the beginning of the data transfer of the rendered first video frame. In either case, the first processing node sends the second task prior to a present job has sent the rendered first video frame to the display controller. The first processing node generates a second pointer specifying a storage location storing data of the second video frame to render and present. The first processing node sends the second pointer with the second task to the second processing node. Circuitry of the second processing node renders the selected first video frame (block 210). The second processing node uses the second pointer to locate the storage location of the second video frame to render.

Since the first processing node sends the second task to render the second video frame prior to the data transfer of the rendered first video frame has completed, the first processing node also sends the second task to render the second video frame prior to the rendered first video frame is sent to the display controller by a present operation. As used herein, a "task," is also referred to as a "job" and an "operation" with each including instructions to be executed by circuitry. Based on one or more of the completion of the render job for the first video frame and the data transfer of the rendered first video frame has begun, in various implementations, the first processing node performs a mock present job that, unbeknownst to the operating system scheduler, does not send the rendered first video frame to the display controller. During the mock present job, the first processing node generates an indication that specifies a present job that sends the rendered first video frame to the display controller has completed, although no information was sent to the display controller. The first processing node has not executed a present job despite generating the indication specifying that a present job has been executed. The first processing node does not yet have the rendered first video frame during the mock present job. In some implementations, a processing circuit (e.g., integrated parallel data processing 124 of FIG. 1) of the first processing node fetches the instructions of the mock present job from an assigned work queue but does not execute the instructions. In an implementation, this processing circuit of the first processing node performs these steps based on executing instructions of a graphics driver that is aware of performing the mock present job. There is no change to the application or the operating system. The operating system scheduler executed by the first processing node is unaware that the first video frame has not been presented to the display controller.

In an implementation, based on the completion of the mock present job, which does not send information to the display controller, the first processing node sends the second task to the second processing node to render the second video frame. In another implementation, the first processing node sends the second task to the second processing node prior to the mock job being completed. In yet another implementation, the first processing node sends the second task to the second processing node based on the data transfer of the rendered first video frame has begun. Therefore, in some implementations, when executing the instructions of the application, the first processing node selects the second video frame and generates the second pointer concurrently with the mock present job, rather than upon completion of the mock present job.

Based on the data transfer job for the rendered first video frame has completed; the first processing node performs a present job that sends the rendered first video frame to the display controller (block 212). The data transport latency before rendering the second video frame has been removed unbeknownst to the operating system scheduler executed by the first processing node. This removal of the data transport latency increases performance and increases utilization of the two processing nodes. In some implementations, the processing circuit (e.g., integrated parallel data processing 124 of FIG. 1) of the first processing node fetches the instructions of the present job from a private queue and executes the instructions unlike the steps performed for the mock present job. In an implementation, this processing circuit of the first processing node fetches the present job from the private queue and executes the instructions to send the rendered first video frame from the framebuffer to the display controller. This processing circuit of the first processing node performs these steps based on executing instructions of the graphics driver that is aware of performing the mock present job earlier.

By performing the above steps, the host processing circuit of the first processing node sends a task to the dedicated processing circuit of the second processing node to render the second video frame prior to a present operation has begun sending, to the display controller, rendered data corresponding to the first video frame. The integrated processing circuit of the first processing node generates an indication that specifies the present operation has completed, although the integrated processing circuit has not yet performed the present operation such as sending information to the display controller. Later, when the first processing node has received the rendered data corresponding to the first video frame, the first processing node performs the present operation and sends information to the display controller.

Figure 3:
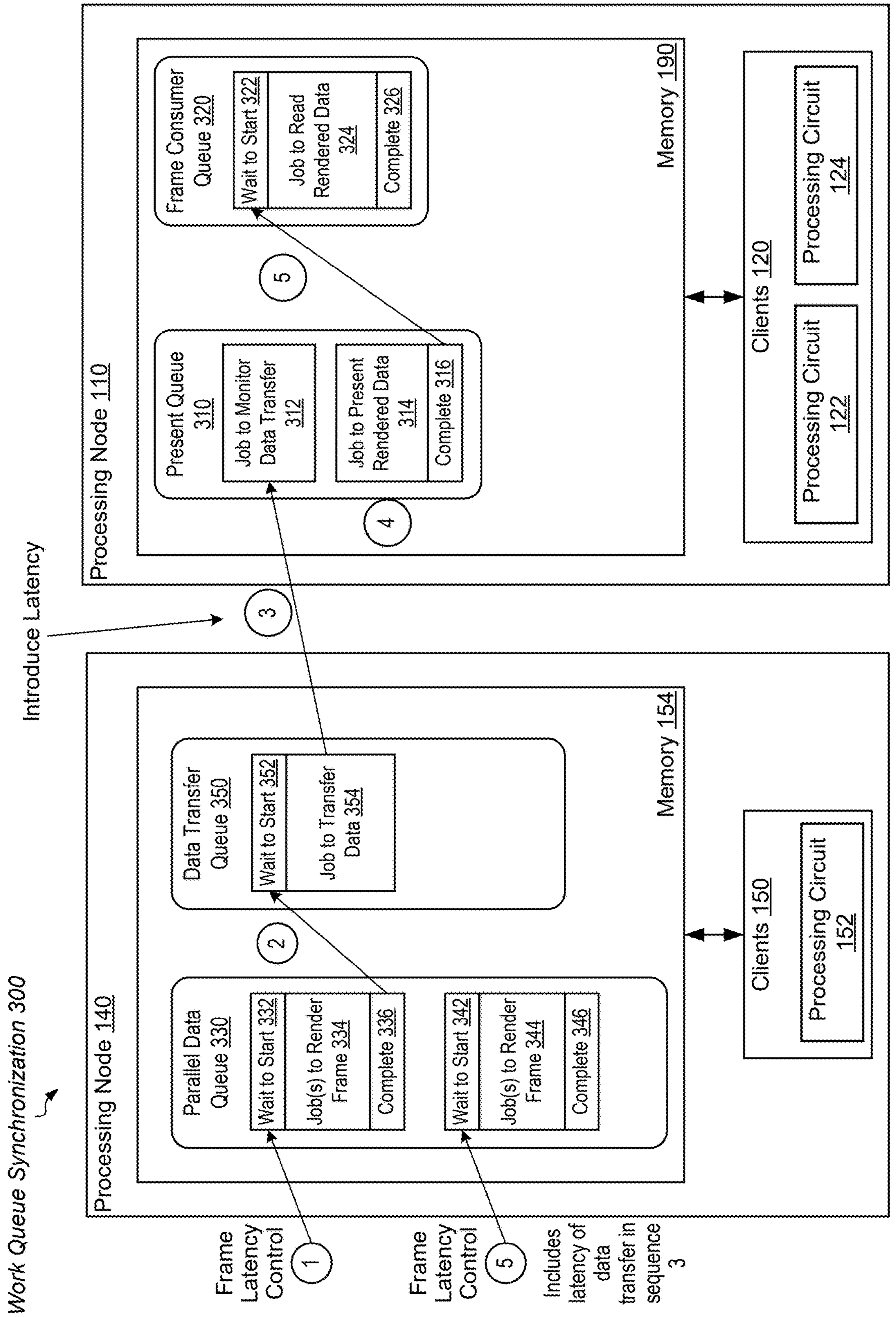
FIG. 3 is a generalized diagram of work queue synchronization.

Turning now to FIG. 3, a generalized diagram is shown of work queue synchronization 300. Circuitry and components described earlier are numbered identically.

In the illustrated implementation, each of processing nodes 110 and 140 has multiple work queues 310, 320, 330 and 350 assigned to them. In various implementations, integrated processing circuit 122 executes an operating system scheduler and assigns the work queues 310, 320, 330 and 350 to processing nodes 110 and 140. Memory 190 stores copies of the present queue 310 and the frame consumer queue 320. Memory 154 of processing node 140 stores copies of the parallel data queue 330 and the data transfer queue 350.

A parallel data application provides a workload for processing nodes 110 and 140. In some implementations, the application is a parallel data graphics application that processes multiple frames of video data. The application includes multiple iterations of a loop with each loop processing a single video frame. The processing includes rendering the video frames on processing node 140, transporting the rendered video data to processing node 110, and presenting the rendered video data, by processing node 110, to a display controller such as display controller 126 (of FIG. 1). When executing instructions of the application, processing circuit 122 uses a frame latency control mechanism that holds the start of the next iteration of the loop for the next video frame until the job to present rendered data 314 completes. The job to present rendered data 314 (or job 314) includes instructions to send the rendered data of the current video frame and instructions to the display controller such as display controller 126 (of FIG. 1). For work queue synchronization 300, when executed by integrated processing circuit 124, job 314 sends information to the display controller. However, as described in further detail later for work queue synchronization 500 (of FIG. 5), when executed by integrated processing circuit 124, job 314 does not send information to the display controller.

A sequence of multiple steps or multiple points-in-time are shown with circled numbers. At sequence 1, host processing circuit 122 selects the next video frame to render and present based on completion of the job to present rendered data 314 (or job 314) for a previous video frame. The parallel data queue 330 is an assigned work queue for dedicated processing circuit 152. In some implementations, the wait to start (or wait) synchronization point 332 is a wait semaphore. In other implementations, the wait synchronization point 332 is another type of synchronizing control that prevents or blocks the jobs(s) to render frame 334 (or job 334) from beginning until a particular control condition has been satisfied such as completion of job 314. Dedicated processing circuit 152 executes the instructions of job 334, which can include multiple separate jobs. By executing job 334, dedicated processing circuit 152 renders the selected video frame.

Upon completion of job 334 at sequence 2, dedicated processing circuit 152 executes the complete synchronization point 336, which generates an indication specifying completion of job 334. In some implementations, the indication is a complete or signal semaphore. In other implementations, the indication is a hardwired signal that is asserted upon completion of job 334. The indication generated at sequence 2 upon completion of job 334 unblocks the wait synchronization point 352 in a work queue such as data transfer queue 350. A direct memory access (DMA) circuit, an input/output (I/O) interface circuit, another integrated circuit, or a combination of integrated circuits of processing node 140 performs the data transfer job 354 (or job 354) to transfer the result data to processing node 110. In some implementations, the result data is rendered video frame data.

At sequence 3, processing node 110 monitors the result data being transferred from processing node 140. In an implementation, host processing circuit 122 assigns the present queue 310 as a work queue to processing circuit 124. In another implementation, host processing circuit 122 places the job to monitor data transfer 312 (or job 312) in another work queue and assigns job 312 to itself or another integrated circuit such as a direct memory access (DMA) circuit or other of processing node 110. In some implementations, when executing the operating system scheduler, host processing circuit 122 places job 314 in the same work queue, such as present queue 310, as job 312. In another implementation, when executing the operating system scheduler, host processing circuit 122 places the jobs 312 and 314 in separate work queues and adds synchronization points to control the order of operations.

At sequence 4, when job 312 has completed, integrated processing circuit 124 begins executing job 314 by executing instructions of a driver and sending result data to another processing circuit. In some implementations, integrated processing circuit 124 sends rendered video frame data and instructions to a display controller such as display controller 126 (of FIG. 1). Upon completion of job 314 at sequence 5, integrated processing circuit 124 executes the complete synchronization point 316, which generates an indication specifying completion of job 314. In some implementations, the indication is a complete or signal semaphore. In other implementations, the indication is a hardwired signal that is asserted upon completion of job 314. The indication generated at sequence 5 upon completion of job 314 unblocks the wait synchronization point 342 in the parallel data queue 330. In another implementation, the indication generated at sequence 5 upon completion of job 314 notifies host processing circuit 122 to increment a count of video frames and unblock wait synchronization point 342 in the parallel data queue 330 when the count reaches a threshold count. In an implementation, the threshold count is one as host processing circuit 122 uses the frame latency control mechanism of the application. The wait synchronization point 342 is a type of synchronizing control that prevents or blocks the jobs(s) to render frame 344 (or job 344) from beginning until a particular control condition has been satisfied. Dedicated processing circuit 152 executes the instructions of job 344, which can include multiple separate jobs. By executing job 344, dedicated processing circuit 152 renders the selected video frame. Upon completion of job 344 at sequence 5, dedicated processing circuit 152 executes the complete synchronization point 346, which generates an indication specifying completion of job 344.

The indication generated at sequence 5 upon completion of job 314 also unblocks the wait synchronization point 322 in frame consumer queue 320. In an implementation, when executing the operating system scheduler, host processing circuit 122 assigns frame consumer queue 320 to a frame consumer such as a desktop compositor or other. The frame consumer executes the job to read rendered data 324 (or job 324). Upon completion, in an implementation, the frame consumer executes the complete synchronization point 326, which generates an indication specifying completion of job 324. In other implementations, there is no complete synchronization point 326. As can be seen, without the optimization provided by the driver executed by integrated processing circuit 124, executing the iterations of the loop of the application includes the latency at sequence 3. The latency of the data transport reduces performance and reduces utilization of at least the two processing nodes (semiconductor chips).

Figure 4:
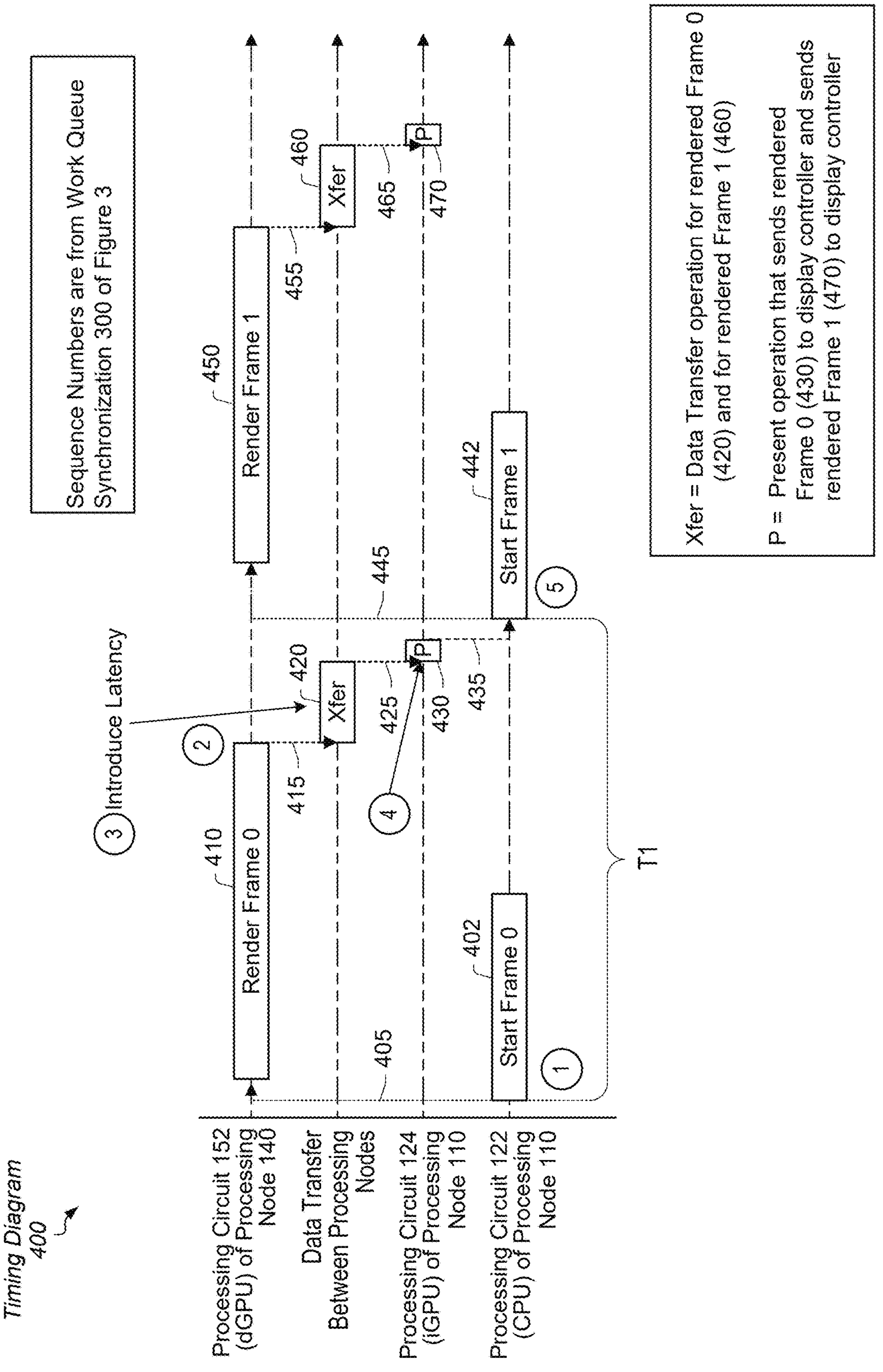
FIG. 4 is a generalized diagram of a timing diagram of managing jobs of a workload performed among multiple processing circuits in separate semiconductor chips.

Referring to FIG. 4, a generalized diagram is shown of a timing diagram 400. The sequences 1-5 shown earlier for the work queue synchronization 300 (of FIG. 3) are repeated here. In the illustrated implementation, a total latency indicated as "T1" exists between rendering and presenting video frames (or frames) when processing circuit 124 (of FIG. 1) does not execute an optimized driver. This latency T1 includes the latency of data transport 420 at sequence 3. At sequence 1, host processing circuit 122 (not shown) selects the next video frame (Frame 0) 402 to render and present based on completion of a previous present job for a previous video frame. When executing instructions of the application, host processing circuit 122 uses a frame latency control mechanism that holds the start of the next iteration of the loop for the next video frame until the present job of a current frame has completed. The control signal 405 indicates that dedicated processing circuit 152 (not shown) can begin a parallel data operation such as rendering Frame 0 402. The control signal 405 corresponds to the wait synchronization point 332 (of FIG. 3). The rendering operation 410 corresponds to job 334 (of FIG. 3).

Upon completion of the rendering operation 410 at sequence 2, dedicated processing circuit 152 generates the control signal 415, which corresponds to the complete synchronization point 336 (of FIG. 3). The control signal 415 initiates the data transfer (xfer) operation 420, which corresponds to job 354 (of FIG. 3). At sequence 3, processing node 110 (not shown) monitors the result data being transferred from processing node 140 (not shown). As can be seen, without the optimization provided by the driver executed by integrated processing circuit 124, executing the iterations of the loop of the application includes the latency at sequence 3. The latency of the data transport reduces performance and reduces utilization of at least the two processing nodes (semiconductor chips).

At sequence 4, when the data transfer operation 420 has completed, processing node 110 generates the control signal 425. In response to control signal 425, integrated processing circuit 124 begins executing the present job 430 by executing instructions of a driver and sending result data to another integrated circuit. The present job 430 corresponds to job 314 (of FIG. 3). In some implementations, integrated processing circuit 124 sends rendered video frame data and instructions to a display controller such as display controller 126 (of FIG. 1). Upon completion of the present operation 430 at sequence 5, integrated processing circuit 124 executes the control signal 435, which is visible to the operating system scheduler. The control signal 435 corresponds to the complete synchronization point 316 (of FIG. 3). The control signal 435 at sequence 5 initiates the start of processing another frame such as Frame 1 442. The signals and operations 445, 450, 455, 460, 465 and 470 repeat the steps performed for signals and operations 405, 410, 415, 420, 425 and 430.

Figure 5:
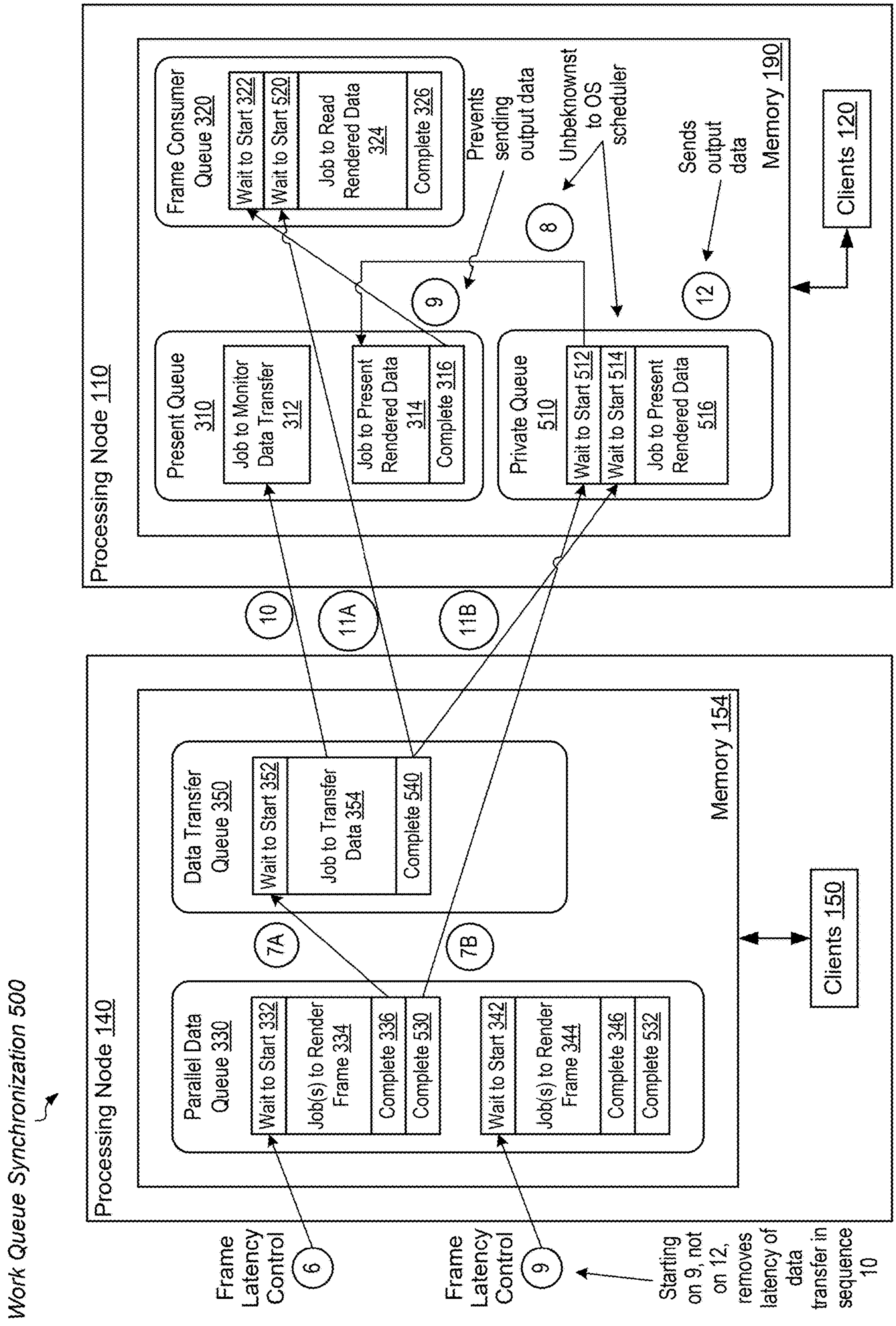
FIG. 5 is a generalized diagram of work queue synchronization that efficiently manages jobs of a workload performed among multiple processing circuits in separate semiconductor chips.

Turning now to FIG. 5, a generalized diagram is shown of work queue synchronization 500 that efficiently manages performance among multiple integrated circuits in separate semiconductor chips. Circuitry and components described earlier are numbered identically. In the illustrated implementation, each of processing nodes 110 and 140 has multiple work queues 310, 320, 330 and 350 assigned to them by an operating system scheduler executed by host processing circuit 122 (of FIG. 1) of clients 120. When executing instructions of an optimized driver, integrated processing circuit 124 (of FIG. 1) of clients 120 assigns a private queue 510 to processing node 110. In some implementations, private queue 510 includes the wait to start (or wait) synchronization points 512 and 514. Additionally, in some implementations, private queue 510 includes job to present rendered data 516 (or job 516). In an implementation, the instructions of job 516 are a copy of the instructions of job 314. In other implementations, job 516 has one or more less instructions and/or one or more additional instructions than job 314.

A sequence of multiple steps or multiple points-in-time are shown with circled numbers. Sequences 6 and 7A are similar to sequences 1 and 2 (of FIG. 3). However, in some implementations, after the complete synchronization point 336 in parallel data queue 330, there is an additional complete synchronization point 530 in parallel data queue 330. The indication generated at sequence 7B upon completion of job 334 unblocks the wait synchronization point 512 in private queue 510. In another implementation, the indication generated at sequence 7A (the complete synchronization point 336) upon completion of job 334 is used to unblock the wait synchronization point 512 in private queue 510. In such an implementation, the complete synchronization point 530 in parallel data queue 330 is not used.

At sequence 8, when the wait synchronization point 512 in private queue 510 is unblocked, integrated processing circuit 124 executing the optimized driver begins executing job 314. Therefore, integrated processing circuit 124 executes job 314 based on wait synchronization point 512 becoming unblocked, rather than completion of job 312. When executing the driver, integrated processing circuit 124 does not send any rendered video data or instructions to the display controller. As described earlier, this operation is referred to as a "mocked present" job or "mock present" job, since the present job 314 in the present queue 310 assigned by the operating system scheduler appears to the operating system scheduler as being executed and completed. Upon completion of job 314 at sequence 9, integrated processing circuit 124 executes the complete synchronization point 316. The indication generated at sequence 9 upon completion of job 314 unblocks the wait synchronization point 342 in the parallel data queue 330. In another implementation, the indication generated at sequence 9 upon completion of job 314 notifies host processing circuit 122 to increment a count of video frames and unblock wait synchronization point 342 in the parallel data queue 330 when the count reaches a threshold count. In an implementation, the threshold count is one as host processing circuit 122 uses the frame latency control mechanism of the application.

The indication generated at sequence 9 upon completion of job 314 also unblocks the wait synchronization point 322 in frame consumer queue 320. However, when executing the instructions of the driver, integrated processing circuit 124 inserts another wait synchronization point 520 in frame consumer queue 320. The wait synchronization point 520 prevents the frame consumer from attempting to read rendered video data, which has not yet completed transfer from processing node 140. By starting the next frame at sequence 9, integrated processing circuit 124 removes the data transport latency unbeknownst to host processing circuit 122 executing the operating system. There is no change to the application. This removal of the data transport latency increases performance and increases utilization of processing nodes 110 and 140.

The steps performed at sequence 10 are similar to the steps performed at sequence 3 (of FIG. 3). Upon completion of job 354 at sequence 11A, processing node 110 executes the complete data transfer point 540, which generates an indication specifying completion of job 354. The indication generated at sequence 11A upon completion of job 354 unblocks the wait synchronization point 520 in frame consumer queue 320. The frame consumer executes the job to read rendered data 324 (or job 324). The indication generated at sequence 11B upon completion of job 354 unblocks the wait synchronization point 514 in private queue 510. At sequence 12, when executing instructions of the driver, integrated processing circuit 124 of clients 120 executes the job to present rendered data 516 (or job 516). Integrated processing circuit 124 sends rendered video frame data and instructions to a display controller such as display controller 126 (of FIG. 1).

Figure 6:
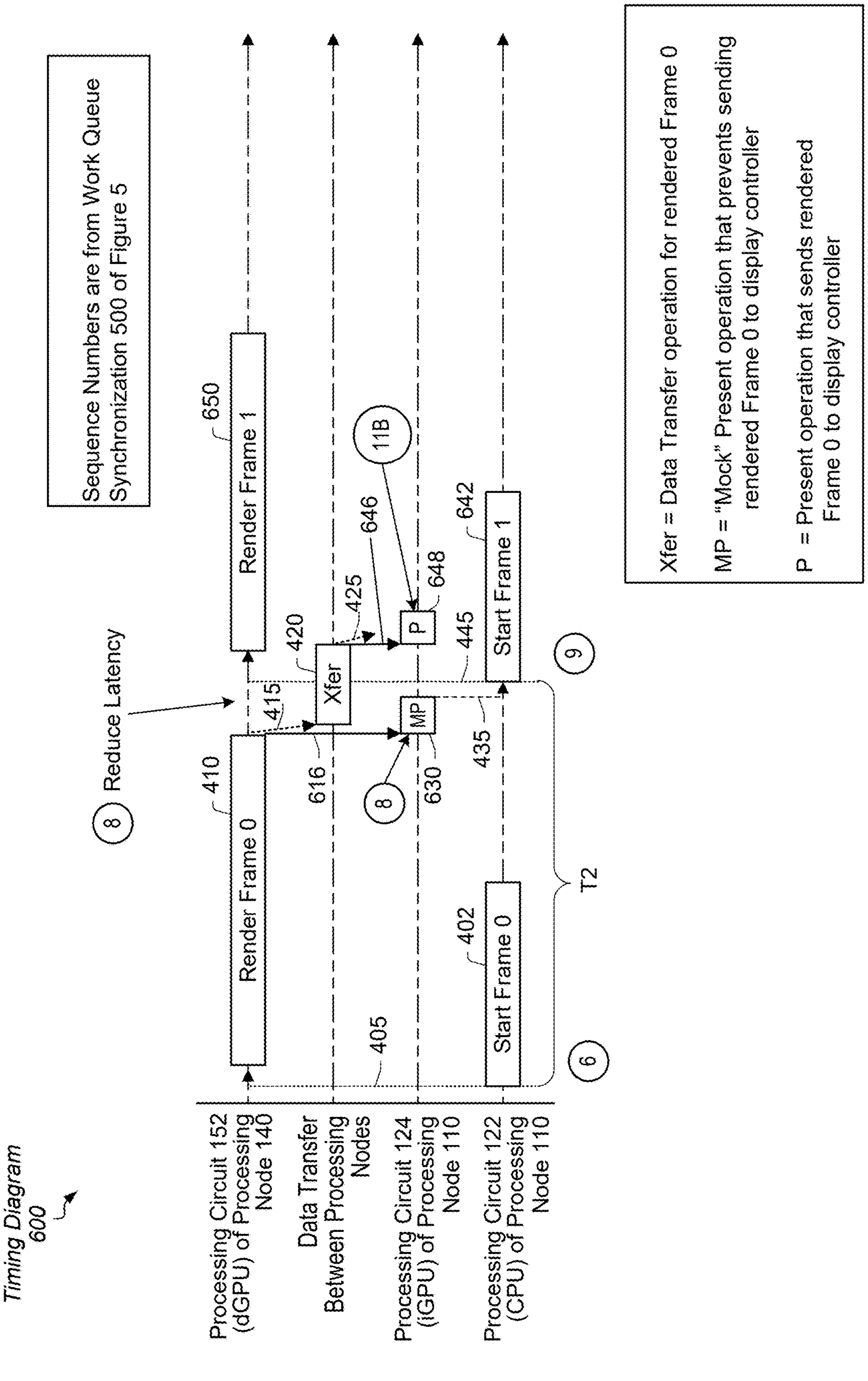
FIG. 6 is a generalized diagram of a timing diagram of efficient management of jobs of a workload performed among multiple processing circuits in separate semiconductor chips.

Referring to FIG. 6, a generalized diagram is shown of a timing diagram 600 that efficiently manages performance among multiple integrated circuits in separate semiconductor chips. Signals and operations described earlier are numbered identically. Some of the sequences 6-12 shown earlier for the work queue synchronization 500 (of FIG. 5) are repeated here. In the illustrated implementation, a total latency indicated as "T2" exists between rendering and presenting video frames (or frames) when integrated processing circuit 124 (of FIG. 1) executes an optimized driver. The latency T2 is less than the latency T1 (of FIG. 4). The control signal 616 corresponds to the wait synchronization point 512 (of FIG. 5). The mock present job 630 ("MP") corresponds to job 314 (of FIG. 5) where integrated processing circuit 124 of clients 120 prevents sending rendered video data or instructions to the display controller. The control signal 646 corresponds to the wait synchronization point 514 (of FIG. 5). The present job 648 ("P") corresponds to job 516 (of FIG. 5) where integrated processing circuit 124 of clients 120 sends rendered video data or instructions to the display controller. Therefore, the host processing circuit 122 sends a task to the dedicated processing circuit 152 to render Frame 1 prior to a present operation has begun sending, to the display controller, rendered data corresponding to Frame 0. The integrated processing circuit 124 generates an indication that specifies the present operation has completed, although the integrated processing circuit 124 has not yet performed the present operation such as sending information to the display controller.

Figure 7:
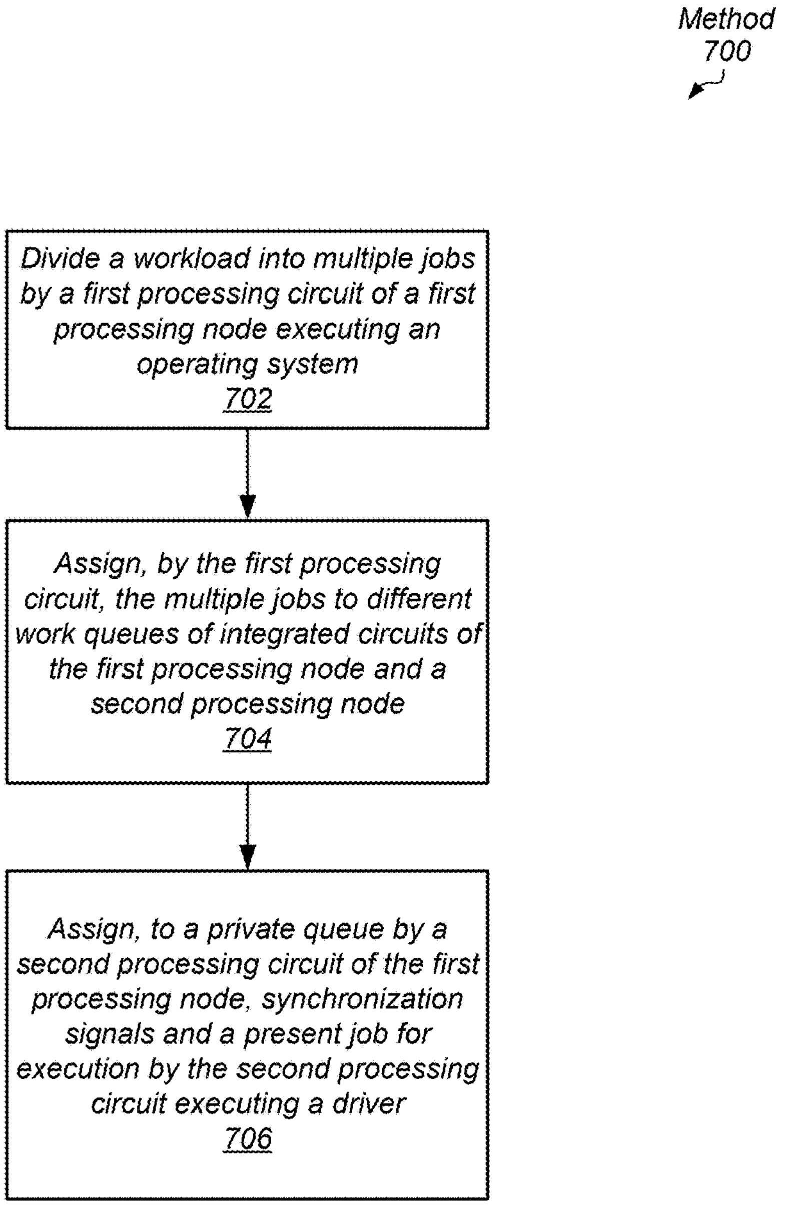
FIG. 7 is a generalized diagram of a method for assigning work queues and a private queue for a workload performed among multiple processing circuits in separate semiconductor chips.

Turning now to FIG. 7, a generalized diagram is shown of a method 700 for assigning work queues and a private queue for a workload performed among multiple processing circuits in separate semiconductor chips. For purposes of discussion, the steps in this implementation (as well as in FIG. 8) are shown in sequential order. However, in other implementations some steps occur in a different order than shown, some steps are performed concurrently, some steps are combined with other steps, and some steps are absent. A computing system includes a first processing node and a second processing node. An application provides a workload for the first processing node and the second processing node. In various implementations, the application is a parallel data graphics application that processes multiple frames of video data. A host processing circuit of the first processing node executing an operating system divides the workload into multiple jobs (block 702). The host processing circuit assigns the multiple jobs to different work queues of integrated circuits of the first processing node and a second processing node (block 704). An integrated processing circuit of the first processing node assigns, to a private queue, one or more wait synchronization signals and a present job for execution by the second processing circuit executing a driver (block 706). The operating system is unaware of the contents of the private queue. In various implementations, the present job provides rendered video frame data and instructions to a display controller. Another present job is stored in a work queue of the first processing node.

Figure 8:
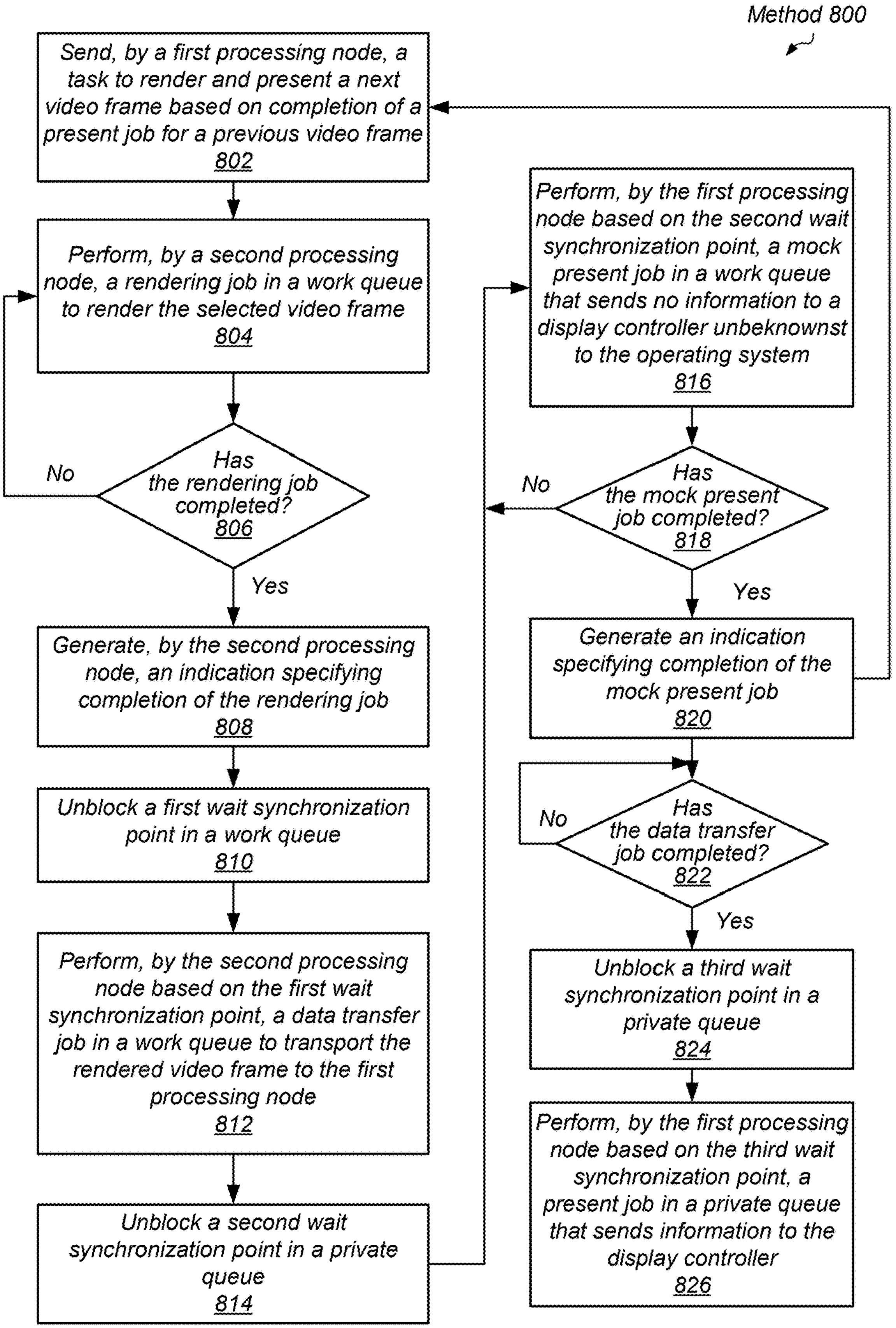
FIG. 8 is a generalized diagram of a method for efficiently managing jobs of a workload performed among multiple integrated circuits in separate semiconductor chips.

Turning now to FIG. 8, a generalized diagram is shown of a method 800 for efficiently managing jobs of a workload performed among multiple integrated circuits in separate semiconductor chips. When executing instructions of an application, a first processing node a task to render and present a next video frame based on completion of a present job for a previous video frame (block 802). Based on the task, a second processing node performs a rendering job in a work queue to render the selected video frame (block 804). If the rendering job has not yet completed ("no" branch of the conditional block 806), then control flow of method 800 returns to block 804 where the second processing node performs the rendering job. If the rendering job has completed ("yes" branch of the conditional block 806), then the second processing node generates an indication specifying completion of the rendering job (block 808). In some implementations, the indication is a complete or signal semaphore. In other implementations, the indication is a hardwired signal that is asserted upon completion of the rendering job.

The indication generated upon completion of the rendering job unblocks a first wait synchronization point in a work queue such as a data transfer work queue (block 810). The second processing node performs, based on the first wait synchronization point, a data transfer job in a work queue to transport the rendered video frame to the first processing node (block 812). The indication generated upon completion of the rendering job unblocks a second wait synchronization point in a private queue (block 814). The first processing node performs, based on the second wait synchronization point, a mock present job in a work queue that sends no information to a display controller unbeknownst to the operating system (block 816).

If the mock present job has not yet completed ("no" branch of the conditional block 818), then control flow of method 800 returns to block 816 where the first processing node performs the mock present job. If the mock present job has completed ("yes" branch of conditional block 816), then the first processing node generates an indication specifying completion of the mock present job (block 820). The indication generated upon completion of the mock present job unblocks a frame latency control wait synchronization point for the first processing node and control flow of method 800 returns to block 802. The first processing node selects the next video frame to render and present based on completion of the mock present job. The operating system scheduler is unaware that the mock present job did not send any information to the display controller.

If the data transfer job has not yet completed ("no" branch of the conditional block 822), then control flow of method 800 returns to the start of the conditional block 822 and waits for the data transfer job to complete. If the data transfer job has completed ("yes" branch of the conditional block 822), then the first processing node unblocks a third wait synchronization point in a private queue (block 824). In an implementation, the first processing node generates an indication specifying completion of the data transfer job, and this indication unblocks the third wait synchronization point in the private queue. The first processing node performs, based on the third wait synchronization point, a present job in a private queue that sends information to the display controller (block 826).

As described earlier, the number of components of a computing system and the number of subcomponents can vary from implementation to implementation. In addition, the arrangement of components, such as components of computing system 100, work queue synchronization 300 and work queue synchronization 500 can vary in other implementations. For example, in an implementation, the display controller is located in the processing node with the dedicated processing circuit, rather than the processing node with the integrated processing circuit. In such an implementation, the integrated processing circuit performs rendering jobs for video frames and the dedicated processing circuit performs present jobs for rendered video frames. In other implementations, the processing node with the dedicated processing circuit includes multiple dedicated processing circuits used for rendering video frames.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
circuitry configured to:
- send a first task to a processing node to render a first video frame;
- receive a first indication that specifies the processing node has generated rendered data corresponding to the first video frame; and
- send a second task to the processing node to render a second video frame, wherein the second task is sent prior to initiating execution of a present operation that sends, to a display controller, rendered data corresponding to the first video frame.

2. The apparatus as recited in claim 1, wherein in response to the first indication, the circuitry is further configured to send the second task to the processing node to render the second video frame.

3. The apparatus as recited in claim 1, wherein the circuitry is further configured to generate a second indication that indicates the present operation has completed, prior to completion of the present operation.

4. The apparatus as recited in claim 3, wherein in response to the second indication, the circuitry is configured to send the second task to the processing node to render the second video frame.

5. The apparatus as recited in claim 3, wherein in response to receiving a third indication that the apparatus has received the rendered data corresponding to the first video frame, the circuitry is configured to initiate execution of the present operation to send the rendered data to the display controller.

6. The apparatus as recited in claim 5, wherein the circuitry comprises a first processing circuit and a second processing circuit, wherein:
- the first processing circuit is configured to execute an operating system scheduler; and
- the second processing circuit is configured to assign at least one or more wait synchronization points to a private queue storing instructions to be executed by the second processing circuit executing a graphics driver and not executed by the first processing circuit executing the operating system scheduler.

7. The apparatus as recited in claim 6, wherein the second processing circuit is further configured to:
- unblock a first wait synchronization point in the private queue, responsive to the first indication; and
- generate the second indication based at least in part on the first wait synchronization point being unblocked.

8. A method, comprising:
- sending, by circuitry of a first processing node, a first task to a second processing node to render a first video frame;
- receiving, by the first processing node, a first indication that specifies the second processing node has generated rendered data corresponding to the first video frame; and
- sending, by the first processing node, a second task to the second processing node to render a second video frame, wherein the second task is sent prior to initiating execution of a present operation that sends, to a display controller, rendered data corresponding to the first video frame.

9. The method as recited in claim 8, wherein in response to the first indication, the method further comprises sending, by the first processing node, the second task to the second processing node to render the second video frame.

10. The method as recited in claim 9, wherein in response to receiving an indication that the first node has received the rendered data corresponding to the first video frame, the method further comprises initiating execution of the present operation, by the first processing node, to send the rendered data to the display controller.

11. The method as recited in claim 8, further comprising generating, by the first processing node, a second indication that indicates the present operation has completed, prior to completion of the present operation.

12. The method as recited in claim 10, wherein in response to the second indication, the method further comprises sending, by the first processing node, the second task to the second processing node to render the second video frame.

13. The method as recited in claim 11, further comprising:

executing, by a first processing circuit of the circuitry of the first processing node, an operating system scheduler; and assigning, by a second processing circuit of the circuitry of the first processing node, at least one or more wait synchronization points to a private queue storing instructions to be executed by the second processing circuit executing a graphics driver and not executed by the first processing circuit executing the operating system scheduler.

14. The method as recited in claim 13, further comprising:

unblocking, by the second processing circuit, a first wait synchronization point in the private queue, responsive to the first indication; and generating, by the second processing circuit, the second indication based at least in part on the first wait synchronization point being unblocked.

15. A computing system comprising:

a first processing node comprising circuitry configured to execute tasks; and a second processing node comprising circuitry configured to execute tasks; and wherein the first processing node comprises:

circuitry configured to:

send a first task to the second processing node to render a first video frame;

receive a first indication that specifies the second processing node has generated rendered data corresponding to the first video frame; and send a second task to the processing node to render a second video frame, wherein the second task is sent prior to initiating execution of a present operation that sends, to a display controller, rendered data corresponding to the first video frame.

16. The computing system as recited in claim 15, wherein in response to the first indication, the circuitry is further configured to send the second task to the second processing node to render the second video frame.

17. The computing system as recited in claim 16, wherein in response to receiving an indication that the first node has received the rendered data corresponding to the first video frame, the circuitry is configured to initiate execution of the present operation to send the rendered data to the display controller.

18. The computing system as recited in claim 15, wherein the circuitry is further configured to generate a second indication that indicates the present operation has completed, prior to completion of the present operation.

19. The computing system as recited in claim 17, wherein in response to the second indication, the circuitry is configured to send the second task to the second processing node to render the second video frame.

20. The computing system as recited in claim 18, wherein the circuitry comprises a first processing circuit and a second processing circuit, wherein:

the first processing circuit is configured to execute an operating system scheduler; and the second processing circuit is configured to assign at least one or more wait synchronization points to a private queue storing instructions to be executed by the second processing circuit executing a graphics driver and not executed by the first processing circuit executing the operating system scheduler.

* * * * *